(12) United States Patent
Harr

(10) Patent No.: US 10,214,874 B2
(45) Date of Patent: Feb. 26, 2019

(54) METHOD AND ARRANGEMENT RELATED TO A ROTATOR

(75) Inventor: Joakim Harr, Vindeln (SE)

(73) Assignee: Indexator Rotator Systems AB, Vindeln (SE)

( * ) Notice: Subject to any disclaimer, the term of this patent is extended or adjusted under 35 U.S.C. 154(b) by 1455 days.

(21) Appl. No.: 13/261,739

(22) PCT Filed: Mar. 22, 2012

(86) PCT No.: PCT/SE2012/000042
§ 371 (c)(1),
(2), (4) Date: Oct. 2, 2013

(87) PCT Pub. No.: WO2012/134370
PCT Pub. Date: Oct. 4, 2012

(65) Prior Publication Data
US 2014/0030008 A1    Jan. 30, 2014

(30) Foreign Application Priority Data

Mar. 26, 2011 (SE) ...................... 1100225

(51) Int. Cl.
*B66C 3/00* (2006.01)
*E02F 3/36* (2006.01)
*F16C 35/02* (2006.01)

(52) U.S. Cl.
CPC ............ *E02F 3/3681* (2013.01); *B66C 3/005* (2013.01); *F16C 35/02* (2013.01); *Y10T 403/32975* (2015.01)

(58) Field of Classification Search
CPC .................................................. E02F 3/3681

USPC ....... 403/164, 348, 359.1; 464/88, 102, 104, 464/105; 901/29
See application file for complete search history.

(56) References Cited

U.S. PATENT DOCUMENTS

| 6,435,235 | B1 | 8/2002 | Hicks | |
|---|---|---|---|---|
| 7,854,592 | B2 * | 12/2010 | Bech | F03D 7/00 416/155 |
| 8,499,884 | B2 * | 8/2013 | Karasek | B60D 5/00 180/403 |
| 8,845,227 | B2 * | 9/2014 | Colombo | F16B 21/02 403/348 |
| 9,151,275 | B2 * | 10/2015 | Dinter | F03D 11/02 |
| 2006/0225311 | A1 | 10/2006 | Voulgaris | |
| 2013/0327010 | A1 * | 12/2013 | Muller | F01D 1/32 60/39.01 |

FOREIGN PATENT DOCUMENTS

DE             3617313       11/1987
WO    WO-2005019642 A1 *  3/2005   ........... F03D 7/0204

* cited by examiner

*Primary Examiner* — Zakaria Elahmadi
*Assistant Examiner* — Bobby Rushing, Jr.
(74) *Attorney, Agent, or Firm* — Mark P. Stone

(57) ABSTRACT

The invention relates to a method and an arrangement related to a rotator, especially for a work tool supported by an arm, whereby the rotator (10) comprises a stator (20) and a rotor (30). A fastening ring (50) for the attaching of a work tool is separately journalled (D) relative to the stator (20) independently of a bearing (B, C) between the stator (20) and the rotor (30). A driver (80; 180; 280) is used to transfer the rotational movement of the rotor (30) to the fastening ring (50).

7 Claims, 6 Drawing Sheets

METHOD AND ARRANGEMENT RELATED TO A ROTATOR

TECHNICAL AREA

The present invention relates to a method related to a rotator in accordance with the preamble of Claim 1. The invention also relates to an arrangement.

BACKGROUND OF THE INVENTION

There is a desire to bring about a low-built or flat rotator that is reliable and functionally reliable.

Purpose of the Invention

A purpose of the present invention is to furnish an extremely advantageous solution for the operational reliability and bearing effectiveness. The purpose of the invention is met in that the invention comprises the features indicated in the claims.

Advantages of the Invention

The arrangement in accordance with the invention relates to a bearing that receives all external load at the same time as the normal bearing between the rotator's stator and rotor is protected from external loads. This brings it about that the two bearings operate without coming in conflict with one another as concerns the transfer, for example, of radial forces. The invention has both technical and economical advantages.

SHORT DESCRIPTION OF THE DRAWINGS

Figure 1:
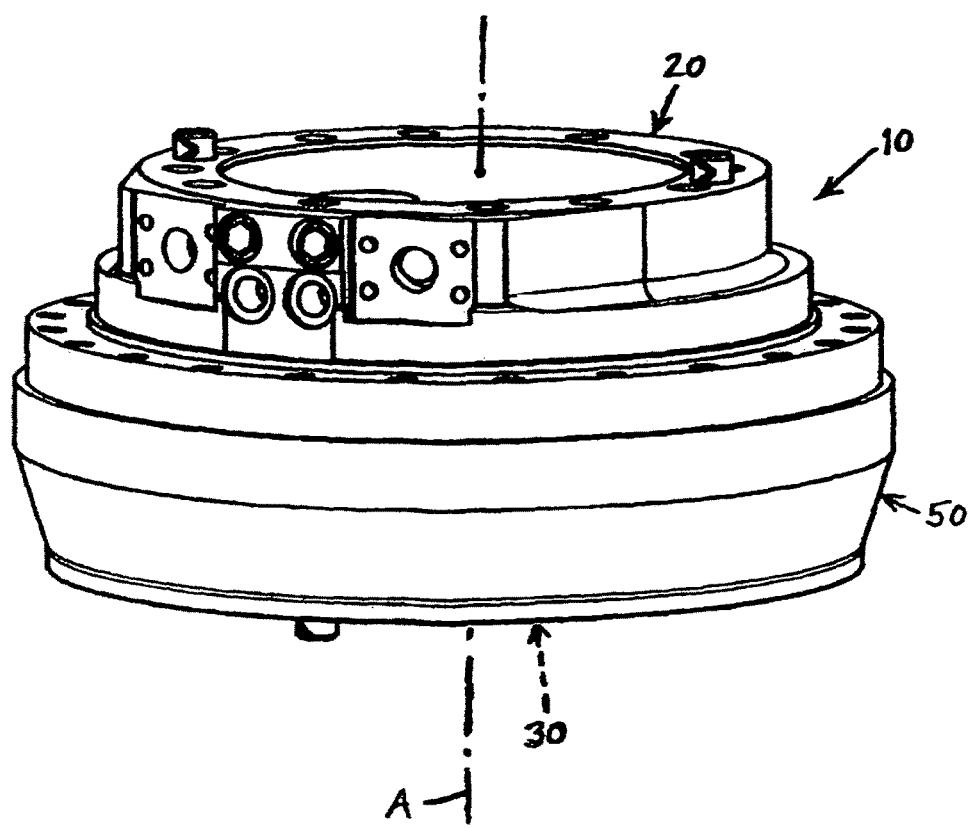
Figure 2:
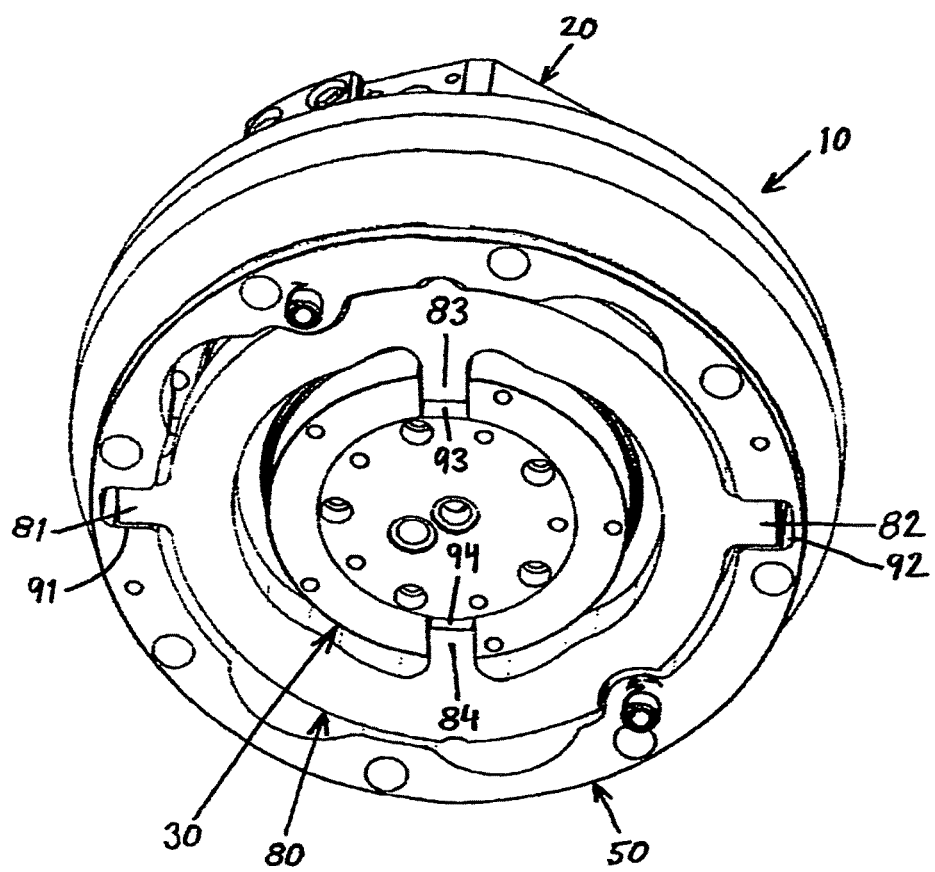
Figure 3:
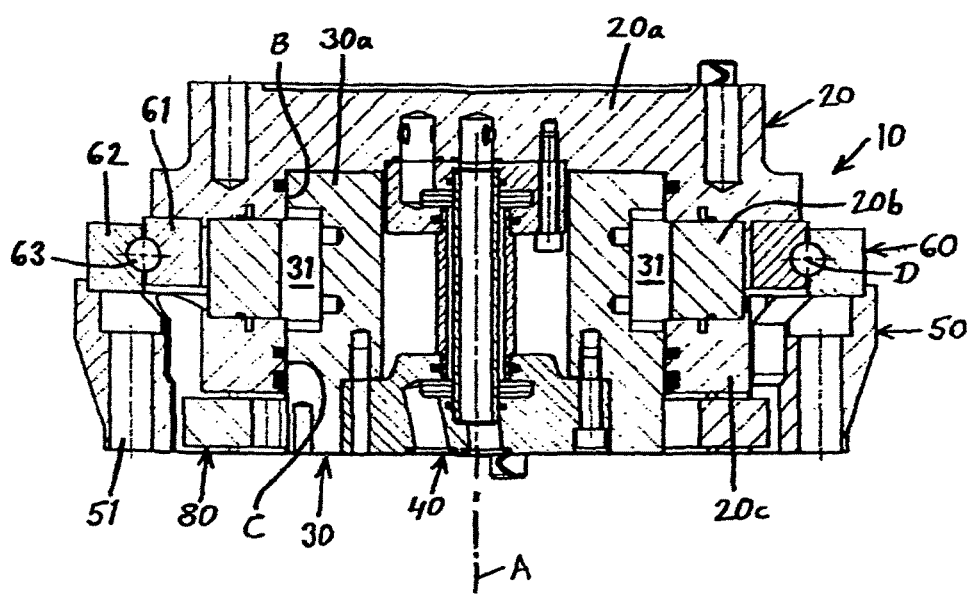
Figure 4:
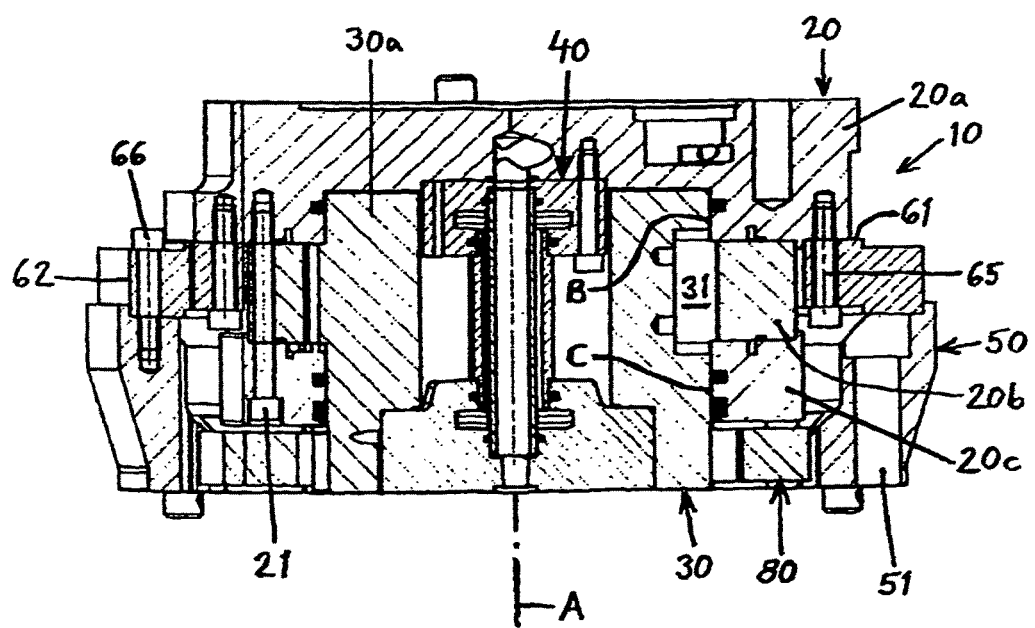
Figure 5:
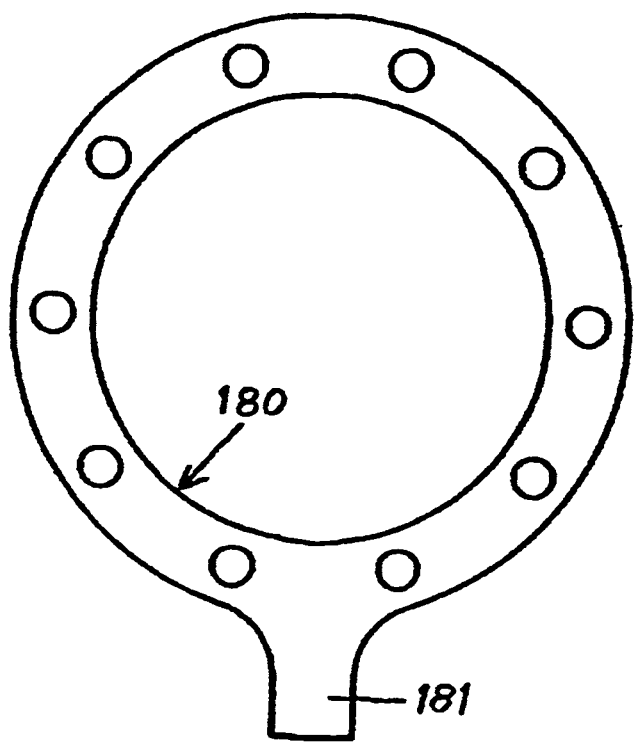
Figure 6:
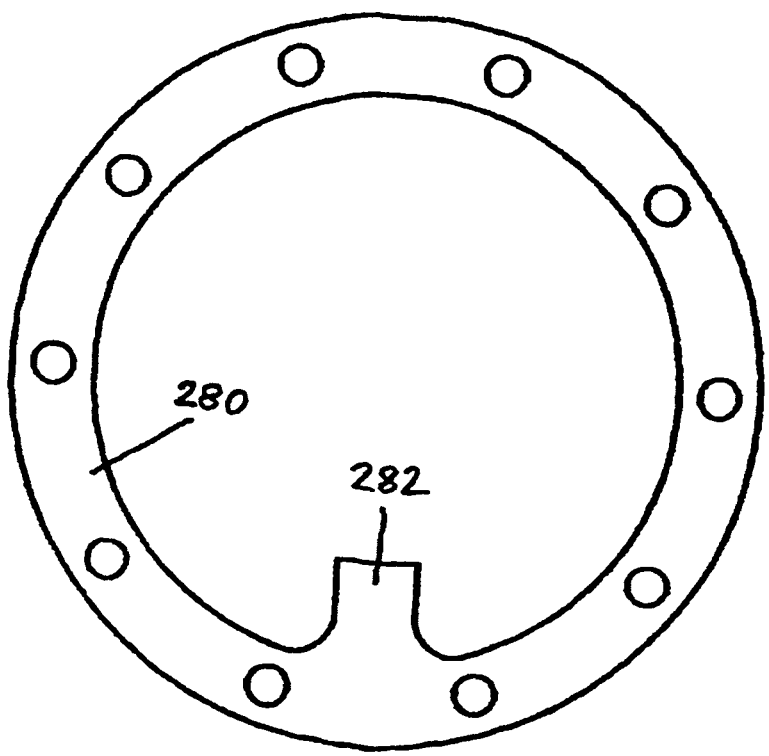

FIG. 1 shows a perspective view of a rotator from above.
FIG. 2 shows the rotator in a perspective view from below.
FIG. 3 shows the rotator in a first vertical section.
FIG. 4 shows the rotator in a second vertical section.
FIGS. 5 and 6 show further embodiments of drivers in accordance with the invention.

DETAILED DESCRIPTION OF THE EXEMPLARY EMBODIMENT SHOWN

The rotator 10 shown in FIGS. 1-4 comprises a stator 20 and a rotor 30. The rotor 30 rotates around a rotational axis A.

The stator 20 comprises an upper stator part 20a, a stator ring 20b and a lower stator part 20c. These parts 20a-20c are mutually connected by fastening elements/screws 21 as is apparent from FIG. 4. During the using of the rotator 10 the stator 20 is normally coupled to a working arm (not shown) or to some other support member in accordance with the purpose via the upper stator part 20a.

The rotator 30 comprises a cylindrical body 30a that is arranged inside the stator 20, as is best apparent from FIGS. 3 and 4. The rotator 30 shown is a so-called wing rotator, that brings it about that a number of wings 31 are arranged around the periphery of the rotor body 30a for cooperation with an adapted inner form of the stator ring 20b and pressure medium control so that the rotor 30 rotates relative to the stator 20. The rotary bearing surfaces B, C for this rotor rotation are arranged between the inner part of the stator 20 and the outer part of the rotor 30.

The rotator 10 shown also comprises a swivel arrangement 40 for bringing pressure medium to, for example, an operating tool. The swivel arrangement is only exemplified and not described in detail since it is known technology and many embodiments are possible.

According to the invention an outer ring/fastening ring/fastening plate 50 is externally arranged on the rotator 10 as is apparent from FIGS. 1-4. The fastening plate 50 is rotatably supported via a bearing D by the stator 20, as is best apparent from FIGS. 3 and 4. Bearing D is built up in the example shown by means of a so-called roller path bearing 60 that comprises an inner 61 and an outer bearing ring 62 between which bearing balls 63 act to impart rotation of the fastening plate 50 relative to the stator 20. The inner bearing ring 61 is anchored to the upper stator part 20a by fastening elements/screws 65 and the outer bearing ring 62 is anchored to the fastening plate/outer ring 50 by fastening elements/screws 66.

The fastening plate 50 is arranged for supporting a rotatable work tool (not shown) directly or via an intermediate fastening (not shown), whereby a number of fastening holes 51 are arranged in the fastening plate for this purpose.

The bearing D has the task of transferring the forces acting between the rotatable work tool, including external loads, and the stator 20. The rotor 30 is therefore protected in this manner from these forces, that are chiefly of an axial nature.

The shown bearing D consists of a roller bearing; however, it can of course be understood that other bearing types can also be used within the framework of the invention such as, for example a sliding bearing.

According to the invention a driver ring 80 is arranged for transferring a rotational movement from the rotor to the fastening plate 50. The driver 80 comprises two outer heels 81, 82 and two inner heels 83, 84 for the purpose of driving. The ring 80 is arranged in a space between the fastening plate 50 and the rotor 30, as is apparent from FIGS. 2-4. The outer heels 81, 82 each engage in its recess 91, 92 in the fastening plate 50. The inner heels 83, 84 each engage in its recess 93, 94 in the rotor 30. Recesses 91-94 have a certain excess dimension relative to corresponding heels 81-84 so that there is the occurrence of slots. These slots make possible a certain movability in driver 80 transversally to axis of rotation A of the rotator 10, which brings it about that the driver can find a floating position where the transfer of the rotational movement from the rotor 30 to the fastening plate 50 takes place without the generation of transverse forces that bring about undesired bearing forces. The driver arrangement in accordance with the invention where the driver is self-aligning is very advantageous since the driver arrangement is forgiving with respect to the effect of force between the rotator bearings so that the bearings do not conflict with one another.

The arranging of the two heel pairs 81, 82 and 83, 84 at a right angle to each other as is shown in FIG. 2 brings about a favourable play of forces in conjunction with a self-aligning of the driver 80.

The driver 80 eliminates the transfer of load from fastening plate 50 of the work tool to rotor 30, which brings about low stresses on the rotor 30 and its bearings B, C. Even in the case of an external overload, for example, via the work tool, the rotor bearings B, C are protected against stresses.

FIG. 5 shows a simplified embodiment relative to a driver 180 that is attached on the bottom of the rotor 30. The driver 180 comprises an outwardly directed heel 181 that fits into a recess in the fastening plate 50. The occurrence of slots between the heel and the recess that was explained earlier is present even in this case for avoiding the transmission of radial forces between the rotor and the fastening plate.

FIG. 6 shows yet another embodiment of a driver 280 that is attached to the bottom of the fastening plate 50. The driver 280 comprises an inwardly directed heel 282 that fits into an oversized recess forming a slot in the rotor 30 so the turning moment can be transferred while the transfer of radial force is eliminated.

The driver member in accordance with the invention is thus designed to take up radial variations of distance based on, for example, bearing play.

The invention can naturally be varied by replacing functionally equivalent components.

Thus, the invention is not limited to that which was shown and described but rather modifications and variations are naturally possible in the framework of the following claims.

The invention claimed is:

1. An arrangement related to a rotator, whereby the rotator (10) comprises a stator (20) and a rotor (30), characterized in that the arrangement comprises a fastening ring (50) for attaching a work tool, and that a bearing (D) is arranged between the stator (20) and the fastening ring (50),
    wherein the fastening ring (50) for the attaching of a work tool is separately journalled relative to the stator (20) independently of a bearing (B, C) between the stator (20) and the rotor (30), and
    a driver (80; 180; 280) for transferring the rotational movement of the rotor (30) to the fastening ring (50),
    wherein the driver (80) is movable laterally relative to the rotor (30), or the fastening ring (50), or both, in order to eliminate stressing conflict between the bearings (B,C) between the stator (20) and the rotor (30), and
    at least one radially outwardly extending tab on said driver received in at least one corresponding recess in said fastening ring, and at least one radially inwardly extending tab on said driver received in at least one corresponding recess in said rotor, said radially outwardly and inwardly extending tabs and corresponding recesses being arranged to enable lateral movement of said driver relative to said rotor, or said fastening ring, or both.

2. The arrangement according to claim 1, characterized in that said driver (80) is in engagement with the rotor (30) and the fastening ring (50) in such a manner that the rotational movement of the rotor is transferred to the fastening ring.

3. The arrangement according to claim 2, characterized in that the engagement of the driver with the rotor (30) and/or the fastening ring (50) is provided with gaps in order to eliminate the transfer of force not related to torque transfer.

4. A rotator (10) comprising a stator (20) and a rotor (30), wherein the rotator (10) comprises a fastening ring (50) for attaching a work tool, a bearing (B, C) between the stator (20) and the rotor (30), and a bearing (D) between the stator (20) and the fastening ring (50),
    said rotator further comprising a driver (80; 180; 280) arranged in a space between the fastening ring (50) and the rotor (30) for transferring the rotational movement of the rotor (30) to the fastening ring (50), wherein the driver comprises at least one of:
    at least one inner tab (83, 84) arranged to cooperate with a recess (93, 94) defining a slot in the rotor (30), and
    at least one outer tab (81, 82) arranged to cooperate with a recess (91,92) defining a slot in the fastening ring (50).

5. The rotator as claimed in claim 4, wherein said inner or outer tab on the driver and the recess in said rotor or said fastening ring are arranged so as to couple said driver, said fastening ring, and said rotor together to enable lateral movement of said driver relative to said rotor, or to said fastening ring, or to both.

6. The rotator as claimed in claim 5, wherein the driver (80) is movable laterally relative to the rotor (30), or the fastening ring (50), or both, to eliminate stressing conflict between the bearings (B,C) between the stator (20) and the rotor (30).

7. A rotator, which rotator comprises a stator and a rotor, wherein the rotator comprises a fastening ring for attaching a work tool, and that a bearing is arranged between the stator and the fastening ring, said bearing being arranged to transfer forces acting between a rotatable work tool and the stator, wherein
    a driver is in engagement with the rotor and the fastening ring in such a manner that the rotational movement of the rotor is transferred to the fastening ring, wherein
    the driver comprises at least one inner tab arranged to engage with at least one recess in the rotor, or at least one outer tab arranged to engage with at least one recess in the fastening ring, or both; and
    the respective tabs and recesses are configured such that a gap is defined between the inner tab of the driver and the rotor when the inner tab of the driver is received in the recess of the rotor, or a gap is defined between the outer tab of the driver and the fastening ring when the outer tab of the driver is received in the recess of the fastening ring, or both, for eliminating the transfer of force not related to torque transfer.

* * * * *